(12) United States Patent
Fong (10) Patent No.: US 8,977,709 B2
(45) Date of Patent: Mar. 10, 2015

(54) USING AN INTERACTIVITY OBJECT TO FACILITATE WEB-BASED AGGREGATION

(75) Inventor: Spencer W. Fong, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 1703 days.

(21) Appl. No.: 11/779,456

(22) Filed: Jul. 18, 2007

(65) Prior Publication Data

US 2009/0024694 A1 Jan. 22, 2009

(51) Int. Cl.
*G06F 15/16* (2006.01)
*G06F 17/30* (2006.01)
*H04L 29/08* (2006.01)

(52) U.S. Cl.
CPC .......... *G06F 17/30902* (2013.01); *H04L 67/02* (2013.01)
USPC ........................................................ 709/218

(58) Field of Classification Search
CPC ..................... H04L 29/08072; H04L 29/0809; H04L 67/02
USPC ................................................................ 709/218
See application file for complete search history.

(56) References Cited

U.S. PATENT DOCUMENTS

| 6,014,702 | A | * | 1/2000 | King et al. | 709/227 |
| 6,157,940 | A | * | 12/2000 | Marullo et al. | 703/27 |
| 7,673,327 | B1 | * | 3/2010 | Polis et al. | 726/5 |
| 2008/0168145 | A1 | * | 7/2008 | Wilson | 709/206 |
| 2010/0031330 | A1 | * | 2/2010 | Von Ahn et al. | 726/5 |

* cited by examiner

*Primary Examiner* — Bryan Lee
(74) *Attorney, Agent, or Firm* — Park, Vaughan, Fleming & Dowler LLP (57) ABSTRACT

Some embodiments of the present invention provide a system that uses an interactivity object to facilitate interactivity during automated web site accesses. During operation, the system examines a web page on the web site to determine a data type for an interactivity request associated with the web page. Next, the system creates an interactivity object, which includes the interactivity request along with the determined data type for the interactivity request. Finally, the system sends the interactivity object to the user to solicit a response from the user.

25 Claims, 4 Drawing Sheets

USING AN INTERACTIVITY OBJECT TO FACILITATE WEB-BASED AGGREGATION

RELATED APPLICATION

The subject matter of this application is related to the subject matter in a co-pending non-provisional application by inventors Spencer W. Fong, Richard M. Ng, Thomas E. Dockman, Rodney A. Robinson and Marvin Mah, entitled, "Using Interactive Scripts to Facilitate Web-Based Aggregation," having Ser. No. 11/771,217, and filing date 29 Jun. 2007.

BACKGROUND

Related Art

The present invention generally relates to systems that automatically aggregate data from websites.

Financial institutions typically provide websites that enable their customers to access account information on-line. Moreover, most people have accounts at a number of different financial institutions. For example, a person might have: (1) bank accounts at a bank, (2) credit-card accounts with different credit-card issuers, and (3) investment accounts with different brokerage firms. This means that the person must visit a number of different websites belonging to different financial institutions to determine their financial position accurately, which is a cumbersome and time-consuming process.

In order to speed up this process, a number of "account aggregation" systems have been developed to compile information from different accounts automatically. To use this type of system, a user typically provides account-access information (such as usernames and passwords) for various accounts, and the account-aggregation system uses this information to gather and compile the account information into a single presentation. These account-aggregation systems typically reside within a web-based application or within client-side software. Note that similar aggregation systems are also used to gather and compile other types of information, such as emails and news articles.

Unfortunately, existing aggregation systems navigate through websites in a programmed fashion that is "static." This means that such systems require data to be already stored (e.g., a username) and also require a website map which is already known. Such systems have problems dealing with "dynamic" situations, where user interaction is required

SUMMARY

Some embodiments of the present invention provide a system that uses an interactivity object to facilitate interactivity during automated web site accesses. During operation, the system examines a web page on the web site to determine a data type for an interactivity request associated with the web page. Next, the system creates an interactivity object, which includes the interactivity request along with the determined data type for the interactivity request. Finally, the system sends the interactivity object to the user to solicit a response from the user.

In some embodiments of the present invention, the system receives a response to the interactivity request from the user. Next, the system determines a data type for the response. The system then creates a response object, wherein the response object includes the response along with the determined data type for the response. Finally, the system returns the response object to the web site.

In some embodiments of the present invention, the system receives the response from: a keyboard, a mouse, a touch-sensitive screen, a biometric device, a hardware token, and a file system.

In some embodiments of the present invention, the response can include: a text answer, a biometric signature, a certificate, a file, and a token.

In some embodiments of the present invention, the interactivity object can include: a text question, an image, an instruction, an audio file, a video file, a HyperText Markup Language (HTML) file, an eXtensible Markup Language (XML) file, and a document.

In some embodiments of the present invention, the client is an application.

In some embodiments of the present invention, the user is a computer system.

In some embodiments of the present invention, the system receives an interactivity object at a client, wherein the interactivity object includes an interactivity request along with a data type for the interactivity request. The system then presents the interactivity request to the user through a presentation mechanism, which is selected based on the data type for the interactivity request.

In some embodiments of the present invention, the presentation mechanism can include: an audio player, a video player, a browser, a text display, and an image viewer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that uses script technology to aggregate data from websites. While navigating through a given website, if the system detects an interactive portion of the website, the system provides an interface to a user to facilitate user interactivity with the website. The system also swaps out a process which is executing the script. Next, after obtaining information/input from the user and forwarding this information to the website, the system resumes executing the script. This system is described in more detail below.

Some embodiments of the present invention provide a system that uses an interactivity object to facilitate interactivity during automated web site accesses. During operation, the system examines a web page on the web site to determine a data type for an interactivity request associated with the web page. Next, the system creates an interactivity object, which includes the interactivity request along with the determined data type for the interactivity request. Finally, the system sends the interactivity object to the user to solicit a response from the user.

In some embodiments of the present invention, the system receives a response to the interactivity request from the user. Next, the system determines a data type for the response. The system then creates a response object, wherein the response object includes the response along with the determined data type for the response. Finally, the system returns the response object to the web site.

In some embodiments of the present invention, the system receives the response from: a keyboard, a mouse, a touch-sensitive screen, a biometric device, a hardware token, and a file system.

In some embodiments of the present invention, the response can include: a text answer, a biometric signature, a certificate, a file, and a token.

In some embodiments of the present invention, the interactivity object can include: a text question, an image, an instruction, an audio file, a video file, a HyperText Markup Language (HTML) file, an eXtensible Markup Language (XML) file, and a document.

In some embodiments of the present invention, the client is an application.

In some embodiments of the present invention, the user is a computer system.

In some embodiments of the present invention, the system receives an interactivity object at a client, wherein the interactivity object includes an interactivity request along with a data type for the interactivity request. The system then presents the interactivity request to the user through a presentation mechanism, which is selected based on the data type for the interactivity request.

In some embodiments of the present invention, the presentation mechanism can include: an audio player, a video player, a browser, a text display, and an image viewer.

Aggregation System

Figure 1:
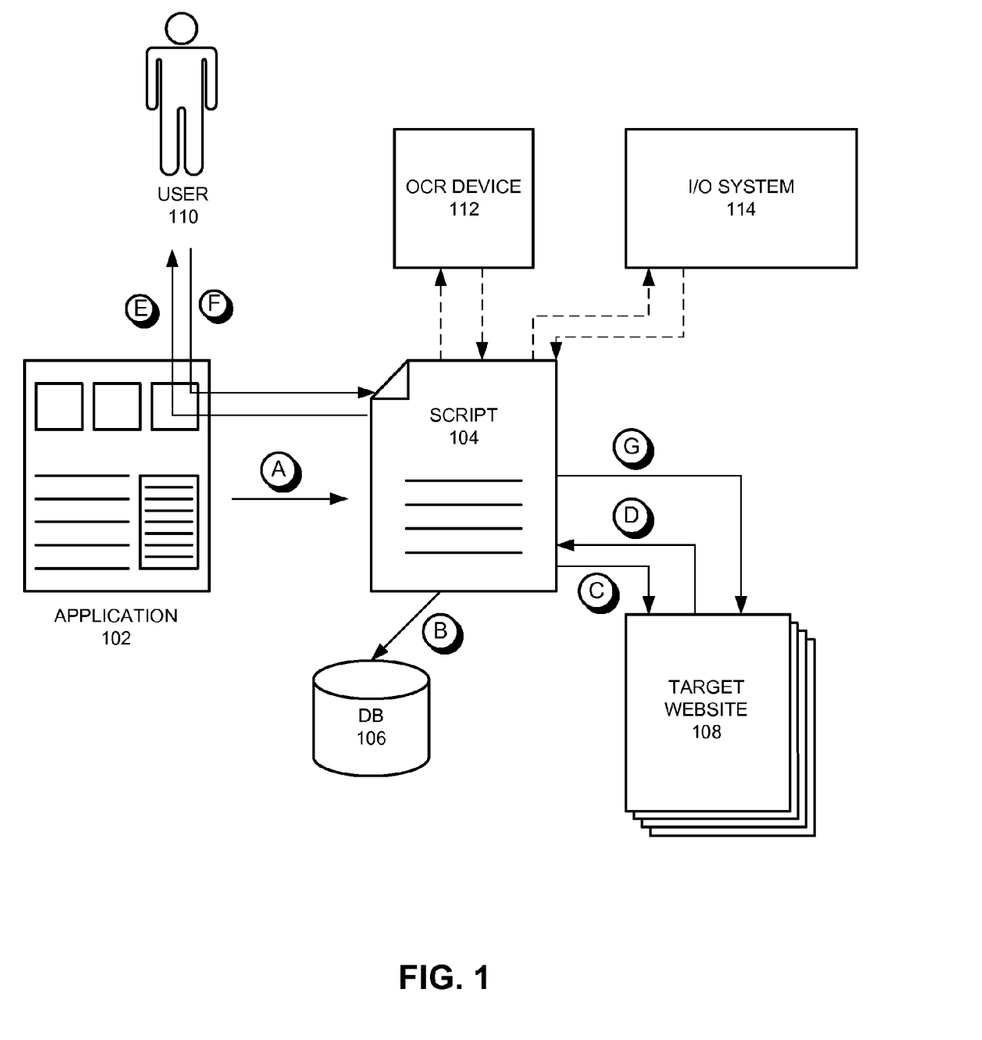
FIG. 1 illustrates an aggregation system in accordance with an embodiment of the present invention.

FIG. 1 illustrates an aggregation system in accordance with an embodiment of the present invention. This aggregation system is associated with an application 102, such as an accounting application, which is operated by a user 110. Application 102 can initiate execution of a script 104 by the aggregation system, for example by executing script 104 on a specialized script engine. Note that script 104 contains various macro-instructions which (when executed) access a target website 108.

In one embodiment of the present invention script 104 executes on a standalone application which includes a script engine. In an alternative embodiment, script 104 is executed by a script engine that is part of application 102. In yet another embodiment, the script executes within a web browser.

Script 104 includes uniform resource locators (URLs) that are directed to pages on websites, such as target website 108, as well as macro-instructions to that navigate through and parse pages on a target website 108. (Note that target website 108 can generally include any type of website from which data can be aggregated, such as a website for a financial institution.) For example, script 104 can first automatically navigate to a logon screen for a financial website. Next, the script can automatically enter a username and password into the logon screen to obtain access to an associated account-summary page. Script 104 can then determine how many accounts are associated with the account-summary page. For each of these accounts, the system can follow a corresponding URL to gather data from one or more pages associated with the account. During this process, if user interaction is required, the system allows the user to provide such input as is described below. For example, the interaction can involve the user reading an obscured word in a digital image and inputting the word as a response. In another example, the interaction can involve the user answering a question in text form, such as "what is your mother's maiden name?"

The aggregation system also includes a database (DB) 106 (or some other type of repository) which contains user-supplied information, such as passwords or credentials, that are used to gain access to various accounts on various websites.

Instead of interacting with user 110, the system can alternatively interact with a device or a computer system. For example, the system can interact with an optical character recognition (OCR) device 112, which, for example, can automatically read a word in a digital image. In general, the system can interact with any type of device or computer system that can perform some type of interaction, for example, such as input/output (I/O) system 114.

In yet another embodiment, instead of interacting with the user, the system can interact with a person who is "on-call" to respond to queries on behalf of users. For example, the person who is on-call might be employed by an organization (such as a call center) to answer such queries on behalf of users.

Facilitating Interactivity During the Navigation Process

Figure 2:
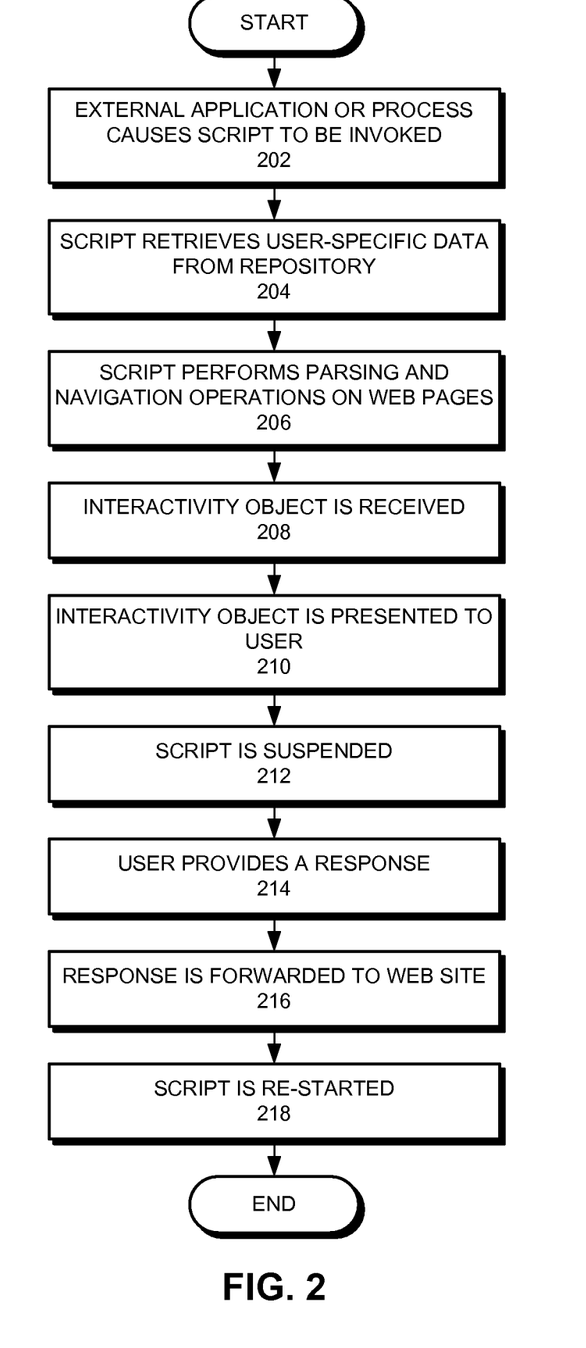
FIG. 2 presents a flow chart illustrating the process of facilitating interactivity while navigating through a website in accordance with an embodiment of the present invention.

FIG. 2 presents a flow chart illustrating the process of facilitating interactivity while navigating through a website in accordance with an embodiment of the present invention. At the start of this process, an external program (or a batch process) causes a script to be invoked (step 202).

Next, the script retrieves user-specific data for a website (such as a username and password) from a repository (such as database 106) (step 204). The script then uses this user-specific data to log on to the website.

Next, the script interacts with the website. This can involve performing "page parsing" operations on web pages to retrieve data from the website and to ascertain the structure of the website. It can also involve performing various navigation operations through various web pages on the website (step 206).

While accessing the website, the website can generate an interactivity request which can be in the form of an "interactivity object" (step 208). In one embodiment of the present invention, the interactivity object is an object defined within an object-oriented programming system. Note that this interactivity object can encapsulate different data types associated with different types of interactivity requests. For example, the interactivity object can include: an image to be viewed by the user; an audio file to be listened to by the user; a question in text form to be presented to the user; or HTML or XML code to generate a presentation to be presented to the user. Note that an HTML presentation can provide a drop-down menu with options that a user can select.

In response to receiving the interactivity object, the system presents the interactivity object to a user 110 of the application 102 which invoked the script. Note that this can involve presenting the interactivity object to user 110 through a user interface for application 102. For example, the user might be asked to recognize an obscured word in a digital image or to recognize some music in an audio file.

In one embodiment of the present invention, the script is then suspended (step 212) while the user takes time to respond. This enables other scripts to run on the script engine.

Next, the user provides a response (step 214), which for example may involve inputting a recognized word or a recognized piece of music, and the response is forwarded to the website (step 216).

In one embodiment of the present invention, the answer is stored by the system in database 106, so that when the same interactivity request is encountered, the system can automatically provide the response instead of asking the user to provide the response again. This feature prevents the user from having to respond to the same query again.

Also note that the response might include biometric data from the user, such as a fingerprint scan or a retina scan.

Finally, the script is re-started to continue processing from where it left off (step 218). Note that when the script is suspended a certain amount of state information must be saved for the script, and when the script is re-started the saved state information needs to be restored.

Macro Language Extensions

Note that a number of extensions can be made to the macro-language in which the scripts are written to facilitate the above-described process.

(1) The macro-language can be extended to obtain interactivity objects to facilitate user interaction.
(2) The macro language can be extended to provide support for suspending execution of a script while a user is responding.
(3) The macro language can be extended to send a query to a user or a third-party system.
(4) The macro language can be extended to receive a response to a query from a user or a third-party system.
(5) The macro language can also be extended to unsuspend or revive a script after a user has responded.

Script API

In one embodiment of the present invention, the system supports invoking and communicating with scripts, such as script 104, through a specialized application programming interface (API), such as a web-services API. This allows the scripts to accept direct requests through the API.

Figure 3:
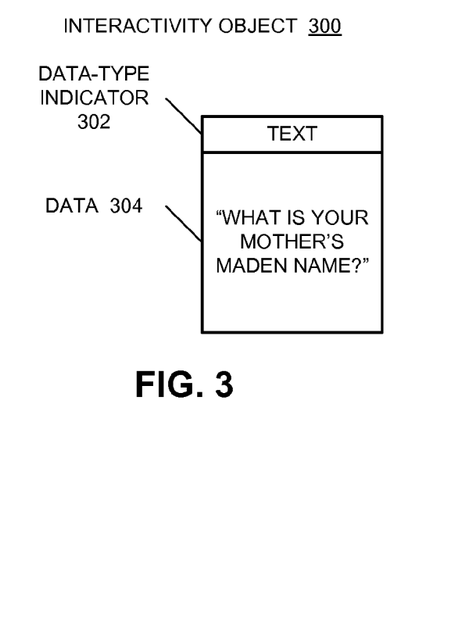
FIG. 3 illustrates an interactivity object in accordance with an embodiment of the present invention.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims Interactivity Objects FIG. 3 illustrates an interactivity object 300 in accordance with an embodiment of the present invention. Interactivity object 300 includes a data-type indicator 302 for the interactivity object 300, as well as the data 304 for the interactivity object 300.

Data-type indicator 302 indicates what type of data 304 is included in interactivity object 300. This can include, but is not limited to: text, audio, video, image, HyperText Markup Language (HTML), a certificate, a file, a document, or a command. Note that interactivity object 300 can include the object that is presented to user 110, or the object that is received from user 110.

Using Interactivity Objects

Figure 4A:
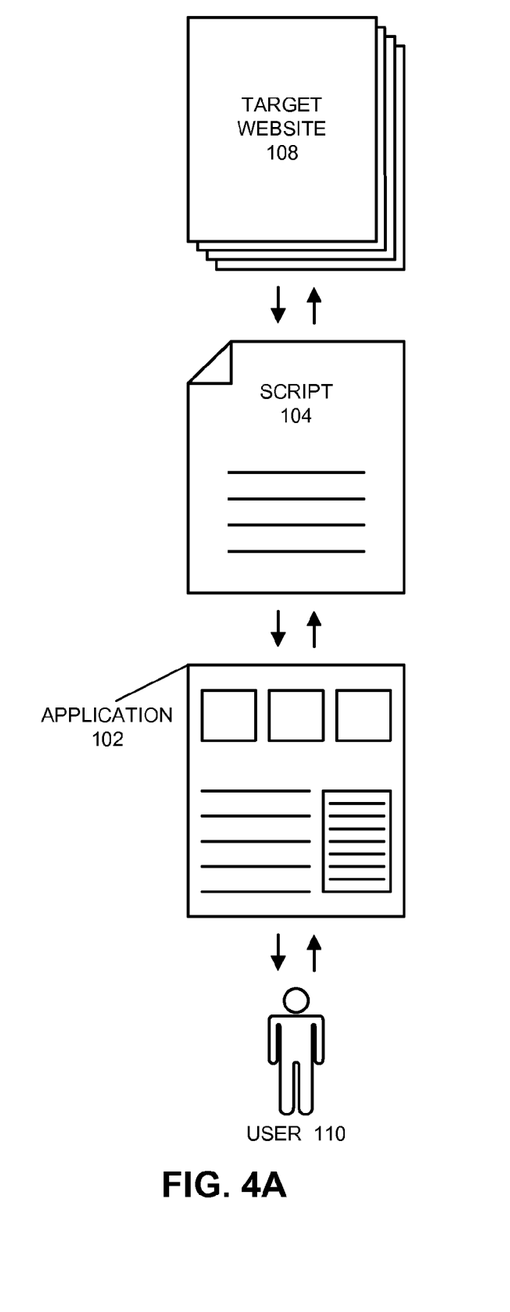
FIG. 4A illustrates exemplary usage of an interactivity object in accordance with an embodiment of the present invention.
Figure 4B:
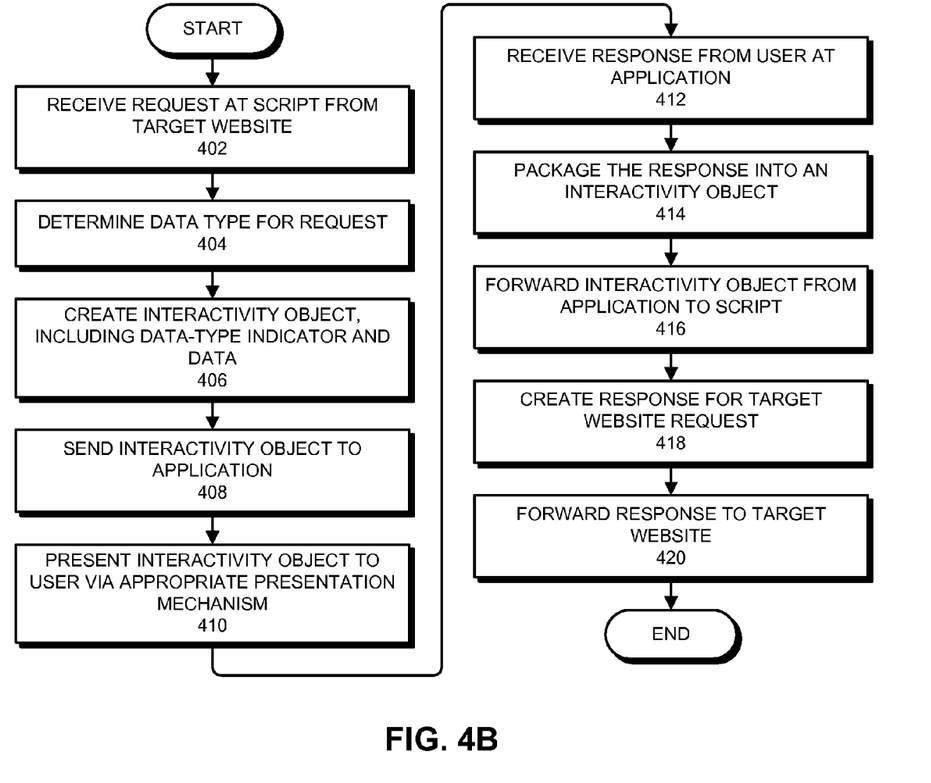
FIG. 4B presents a flow chart illustrating the process of using an interactivity object in accordance with an embodiment of the present invention.

FIG. 4A illustrates an exemplary use of an interactivity object 300, and FIG. 4B presents a corresponding flow chart illustrating the process of using an interactivity object 300 in accordance with an embodiment of the present invention.

During operation, script 104 receives a request from target website 108 (operation 402). Note that this request could be in the form of: a "challenge question" that requires a response from user 110, an image file with partially obfuscated numbers that requires that requires identification of the numbers by user 110, a document that requires processing by user 110, etc. Next, script 104 determines a data-type for the request (operation 404). Upon determining the data-type, script 104 creates interactivity object 300, including data-type indicator 302 and data 304 (operation 406).

Next, script 104 sends interactivity object 300 to application 102 (operation 408). Note that in some embodiments of the present invention, script 104 is running inside of application 102, while in other embodiments of the present invention, target website 108, script 104, and application 102, are all on separate computing devices. Upon receiving interactivity object 300, application 102 presents interactivity object 300 to user 110 via the appropriate presentation mechanism (operation 410). For example, application 102 may present a text question to user 110 via a web browser, or application 102 may present an image to user 110 via an image viewer.

Note that in some embodiments of the present invention, user 110 may include a physical device rather than a person. In these embodiments of the present invention, user 110 may perform some automatic processing on interactivity object 300, such as performing an Optical Character Recognition (OCR) operation.

Next, application 102 receives a response from user 110 (operation 412). Note that the response can be in the form of a text string, a biometric signature (wherein user 110 used a biometric device such as a fingerprint scanner), a designation of a data file, including a digital certificate, etc.

Upon receiving the response, application 102 packages the response into interactivity object 300 (operation 414). Application 102 then forwards interactivity object 300 to script 104 (operation 416). Script 104 then processes interactivity object 300 to create a response to the request from target website 108 (operation 418). Finally, script 104 forwards the response to target website 108 (operation 420).

In some embodiments of the present invention, the system interacts with target website 108 such that it would appear to target website 108 as if target website 108 is interacting directly with user 110. Furthermore, in some embodiments of the present invention, user 110 is only presented with interactivity object 300 via an appropriate presentation mechanism and is never presented with any web pages from target website 108.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating interactivity during automated web-site accesses, comprising:
   receiving, at a computer, a request to access a user account residing on a target web site;
   retrieving, from a local repository, authentication credential associated with the user in response to the request,
   using the authentication credential to access the user account,
   receiving an interactive challenge while accessing a web page associated with the user account, wherein the interactive challenge requests user response which is different from the authentication credential;
   examining the web page to determine a data type for the interactive challenge;
   creating an interactivity object by encapsulating the interactive challenge and a data type indicator indicating the determined data type for the interactive challenge;
   sending the interactivity object to the user to solicit a response from the user;
   receiving a response to the interactivity challenge from the user;
   determining an expected format for the response for the web site;
   creating a response object, wherein the response object includes the response in the expected format;
   saving in the local repository the interactive challenge and the response object to facilitate subsequent responses to the interactive challenge without user input; and
   returning the response object to the web site.

2. The method of claim 1, wherein receiving the response further comprises receiving the response from a response mechanism, and wherein the response mechanism can include:
   a keyboard;
   a mouse;
   a touch-sensitive screen;
   a biometric device;
   a hardware token; and
   a file system.

3. The method of claim 1, wherein the response can include:
   a text answer;
   a biometric signature;
   a certificate;
   a file; and
   a token.

4. A method for facilitating interactivity during automated web-site accesses, comprising:
   receiving an interactivity object at a client computer, wherein the interactivity object encapsulates an interactive challenge and a data type indicator indicating a data type for the interactive challenge, wherein the interactivity object is generated by a process which automatically accesses a user account residing on a target web site, wherein the process accesses the user account by retrieving authentication credential from a local repository, and wherein the interactive challenge requests user response which is different from the authentication credential;
   presenting the interactivity challenge to the user through a presentation mechanism which is selected based on the data type for the interactivity challenge;
   receiving a response to the interactivity challenge from the user;
   determining a data type for the response;
   creating a response object, wherein the response object includes the response along with the determined data type for the response;
   saving in the local repository the interactive challenge and the response object to facilitate subsequent responses to the interactive challenge without user input; and
   returning the response object to the web site.

5. The method of claim 4, wherein the presentation mechanism can include:
   an audio player;
   a video player;
   a browser;
   a text display; and
   an image viewer.

6. The method of claim 4, wherein receiving the response further comprises receiving the response from a response mechanism, and wherein the response mechanism can include:
   a keyboard;
   a mouse;
   a touch-sensitive screen;
   a biometric device;
   a hardware token; and
   a file system.

7. The method of claim 4, wherein the response can include:
   a text answer;
   a biometric signature;
   a certificate;
   a file; and
   a token.

8. The method of claim 4, wherein the interactivity object can include:
   a text question;
   an image;
   an instruction;
   an audio file;
   a video file;
   a HyperText Markup Language (HTML) file;
   an eXtensible Markup Language (XML) file; and
   a document.

9. The method of claim 4, wherein the client is an application.

10. The method of claim 4, wherein the user is a computer system.

11. A non-transitory computer-readable storage medium storing instructions that when executed by a computer cause the computer to perform a method for facilitating interactivity during automated web-site accesses, the method comprising:
    receiving a request to access a user account residing on a target web site;
    retrieving, from a local repository, authentication credential associated with the user in response to the request,
    using the authentication credential to access the user account,
    receiving an interactive challenge while accessing a web page associated with the user account, wherein the interactive challenge requests user response which is different from the authentication credential;
    examining the web page to determine a data type for the interactive challenge;
    creating an interactivity object by encapsulating the interactive challenge and a data type indicator indicating the determined data type for the interactive challenge;
    sending the interactivity object to the user to solicit a response from the user;

receiving a response to the interactivity challenge from the user;
determining an expected format for the response for the web site;
creating a response object, wherein the response object includes the response in the expected format;
saving in the local repository the interactive challenge and the response object to facilitate subsequent responses to the interactive challenge without user input; and
returning the response object to the web site.

12. The computer-readable storage medium of claim 11, wherein receiving the response further comprises receiving the response from a response mechanism, and wherein the response mechanism can include:
a keyboard;
a mouse;
a touch-sensitive screen;
a biometric device;
a hardware token; and
a file system.

13. The computer-readable storage medium of claim 11, wherein the response can include:
a text answer;
a biometric signature;
a certificate;
a file; and
a token.

14. A non-transitory computer-readable storage medium storing instructions that when executed by a computer cause the computer to perform a method for facilitating interactivity during automated web-site accesses, the method comprising:
receiving an interactivity object at a client, wherein the interactivity object encapsulates an interactive challenge along with a data type indicator indicating a data type for the interactive challenge, wherein the interactivity object is generated by a process which automatically accesses a user account residing on a target web site, wherein the process accesses the user account by retrieving authentication credential from a local repository, and wherein the interactive challenge requests user response which is different from the authentication credential;
presenting the interactivity challenge to the user through a presentation mechanism which is selected based on the data type for the interactivity challenge;
receiving a response to the interactivity challenge from the user;
determining a data type for the response;
creating a response object, wherein the response object includes the response along with the determined data type for the response;
saving in the local repository the interactive challenge and the response object to facilitate subsequent responses to the interactive challenge without user input; and
returning the response object to the web site.

15. The computer-readable storage medium of claim 14, wherein the presentation mechanism can include:
an audio player;
a video player;
a browser;
a text display; and
an image viewer.

16. The computer-readable storage medium of claim 14, wherein receiving the response further comprises receiving the response from a response mechanism, and wherein the response mechanism can include:
a keyboard;
a mouse;
a touch-sensitive screen;
a biometric device;
a hardware token; and
a file system.

17. The computer-readable storage medium of claim 14, wherein the response can include:
a text answer;
a biometric signature;
a certificate;
a file; and
a token.

18. The computer-readable storage medium of claim 14, wherein the interactivity object can include:
a text question;
an image;
an instruction;
an audio file;
a video file;
a HyperText Markup Language (HTML) file;
an eXtensible Markup Language (XML) file; and
a document.

19. The computer-readable storage medium of claim 14, wherein the client is an application.

20. The computer-readable storage medium of claim 14, wherein the user is a computer system.

21. An apparatus configured for facilitating interactivity during automated web-site accesses, comprising:
a receiving mechanism configured to receive a request to access a user account residing on a target web site;
a retrieving mechanism configured to retrieve, from a local repository, authentication credential associated with the user in response to the request,
an user-account-access mechanism configured to use the authentication credential to access the user account, and
a challenge-receiving mechanism configured to receive an interactive challenge while accessing a web page associated with the user account, wherein the interactive challenge requests user response which is different from the authentication credential;
an examination mechanism configured to examine the web page to determine a data type for the interactive challenge;
a creation mechanism configured to create an interactivity object by encapsulating the interactive challenge and a data type indicator indicating the determined data type for the interactive challenge;
a delivery mechanism configured to send the interactivity object to the user to solicit a response from the user;
wherein the receiving mechanism is further configured to receive a response to the interactivity challenge from the user;
a determination mechanism configured to determine an expected format for the response for the web site;
wherein the creation mechanism is further configured to create a response object, wherein the response object includes the response in the expected format;
a saving mechanism configured to save in the local repository the interactive challenge and the response object to facilitate subsequent responses to the interactive challenge without user input; and
wherein the delivery mechanism is further configured to return the response object to the web site.

22. The apparatus of claim 21, wherein the receiving mechanism is further configured to receiving the response from a response mechanism, and wherein the response mechanism can include:
- a keyboard;
- a mouse;
- a touch-sensitive screen;
- a biometric device;
- a hardware token; and
- a file system.

23. The apparatus of claim 21, wherein the response can include:
- a text answer;
- a biometric signature;
- a certificate;
- a file; and
- a token.

24. An apparatus configured for facilitating interactivity during automated web-site accesses, comprising:
- a receiving mechanism configured to receive an interactivity object at a client, wherein the interactivity object encapsulates an interactive challenge and a data type indicator indicating a data type for the interactive challenge, wherein the interactivity object is generated by a process which automatically accesses a user account residing on a target website, wherein the process accesses the user account by retrieving authentication credential from a local repository, and wherein the interactive challenge requests user response which is different from the authentication credential;
- a presentation mechanism configured to present the interactivity challenge to the user based on the data type for the interactivity challenge;
- wherein the receiving mechanism is further configured to receive a response to the interactivity challenge from the user;
- a determination mechanism configured to determine a data type for the response;
- a creation mechanism configured to create a response object, wherein the response object includes the response along with the determined data type for the response;
- a saving mechanism configured to save in the local repository the interactive challenge and the response object to facilitate subsequent responses to the interactive challenge without user input; and
- a delivery mechanism configured to return the response object to the web site.

25. The apparatus of claim 24, wherein the presentation mechanism can include:
- an audio player;
- a video player;
- a browser;
- a text display; and
- an image viewer.

* * * * *